United States Patent [19]

Kajino

[11] Patent Number: 5,016,743
[45] Date of Patent: May 21, 1991

[54] VEHICLE HAVING A WET TYPE MAIN CLUTCH

[75] Inventor: Masayor Kajino, Osaka, Japan

[73] Assignee: Kubota Ltd., Japan

[21] Appl. No.: 407,249

[22] Filed: Sep. 14, 1989

[30] Foreign Application Priority Data

Sep. 21, 1988 [JP] Japan ............................ 63-124394[U]
Dec. 28, 1988 [JP] Japan ............................ 63-170136[U]
Mar. 13, 1989 [JP] Japan ............................ 1-28879[U]

[51] Int. Cl.⁵ .......................................... F16D 13/58
[52] U.S. Cl. ............................. 192/70.12; 192/110 R; 192/112; 192/113 B
[58] Field of Search .................. 192/70.12, 99 S, 112, 192/110 R, 110 S, 113 B, 70.13

[56] References Cited

U.S. PATENT DOCUMENTS

| | | | |
|---|---|---|---|
| 1,954,234 | 4/1934 | Zimmermann | 192/99 S |
| 2,296,535 | 9/1942 | Nutt | 192/99 S |
| 2,335,926 | 12/1943 | Fawick | 192/112 X |
| 2,760,615 | 8/1956 | Kershner | 192/112 X |
| 2,882,744 | 4/1959 | Keller | 192/99 S X |
| 3,112,820 | 12/1963 | Falk | 192/99 S |

FOREIGN PATENT DOCUMENTS 57-134020 8/1982 Japan ............................ 192/70.12

*Primary Examiner*—Richard Lorence
*Attorney, Agent, or Firm*—Webb, Burden, Ziesenheim & Webb

[57] ABSTRACT

A vehicle comprising a wet type main clutch mounted in an oil bath within a clutch housing. A flywheel housing is removably attached to a forward end of the clutch housing, with a partition wall in between for preventing oil flow from the clutch housing to the flywheel housing. A clutch input shaft extends through the partition wall, with a forward end splined to a flywheel. A clutch output shaft coaxial with the clutch input shaft has a rear end thereof connected through a spline connection to a change speed shaft extending forwardly through a rear wall of the clutch housing. A geometric engaging device having an aligning function is provided between the clutch output shaft and change speed shaft.

4 Claims, 6 Drawing Sheets

IX~IX

VEHICLE HAVING A WET TYPE MAIN CLUTCH

BACKGROUND OF THE INVENTION (1) Field of the Invention

The present invention relates to a vehicle employing a wet clutch as a main clutch, and particularly to a mounting structure for attaching the wet clutch to a vehicle body.

(2) Description of the Prior Art

Either a dry clutch or a wet clutch is used as the main clutch of a tractor. The civil engineering tractor employs a wet clutch since, compared with the case of the agricultural tractor, the clutch is subjected to great loads and used for long periods of time, as disclosed in Japanese Utility Model publication Kokai No. 54-90549.

It is, however, very difficult to assemble and disassemble the main clutch disclosed in the above publication. Where a clutch pack is mounted on a clutch output shaft provided separately from a clutch input shaft to facilitate assembly and disassembly, it is difficult to secure a coaxial relation between the engine side and main change speed shaft side.

SUMMARY OF THE INVENTION

An object of the present invention is to provide a vehicle having a wet type main clutch mounting structure which facilitates clutch assembly and disassembly, and allows the clutch to be assembled in a manner to assure the coaxial relation.

In order to achieve the above object, a vehicle having a wet type main clutch according to the present invention comprises a clutch housing for enclosing the wet type main clutch in an oil bath, a flywheel housing removably attached to a forward end of the clutch housing in a fore and aft direction of a vehicle body for enclosing an engine flywheel, a partition wall disposed at the forward end of the clutch housing for preventing oil flow from the clutch housing to the flywheel housing, a clutch input shaft supported by the partition wall through a bearing and including a forward end splined to the flywheel, a clutch output shaft disposed coaxially with the clutch input shaft, a clutch pack mounted between the clutch input shaft and the clutch output shaft to act as the main clutch, a main change speed shaft projecting forwardly through a rear wall of the clutch housing, spline connection means for connecting a forwardly projecting portion the the main change speed shaft to a rear end of the clutch output shaft, and geometric engaging means having an aligning function and disposed between the clutch output shaft and the forwardly projecting portion of the main change speed shaft.

In the above construction, the forwardly projecting portion of the main change speed shaft is connected coaxially with the clutch output shaft by the spline connection means. Besides, axial displacement between the clutch output shaft and main change speed shaft is prevented by the geometric engaging means disposed therebetween, since this engaging means has an aligning function. The spline connection means can include a spline sleeve mounted on the projecting portion of the main change speed shaft and has a larger inner spline portion and a smaller spline portion. A spline portion defined on the clutch output shaft is inserted into the forward larger inner spline portion of the spline sleeve. A spline portion defined on the projecting portion of the main change speed shaft is inserted into a rearward smaller spline portion of the spline portion. The spline sleeve defines a stepped portion for limiting insertion of the clutch shaft.

Further, the clutch input shaft is splined to the flywheel, with the clutch housing and flywheel housing interconnected to be separable in the fore and aft direction of the vehicle body. This construction allows the wet type main clutch to be assembled in position without axial displacement. With this clutch mounted in the clutch housing, oil flows to the flywheel housing is prevented by the partition wall having a sealing effect.

In a preferred embodiment of the invention, the partition wall defines a peripheral groove around an outer periphery thereof for receiving an O-ring, and the clutch housing is connected to the partition wall through a geometric engaging device engageable with the outer periphery of the partition wall in the fore and aft direction, the engaging device being sealed by the O-ring.

According to this embodiment, the wet type main clutch may be mounted in position with oil leakage from the clutch housing to the flywheel housing completely eliminated.

The geometric engaging device for connecting the partition wall is effective to promote strength as well as aligning precision.

The foregoing and other objects, features and advantages of the invention will be apparent from the following more particular description of a preferred embodiment of the invention, as illustrated in the accompanying drawings.

BRIEF DESCRIPTION OF THE DRAWINGS

The drawings show an embodiment of the present invention, in which.

DESCRIPTION OF THE PREFERRED EMBODIMENT

Figure 1:
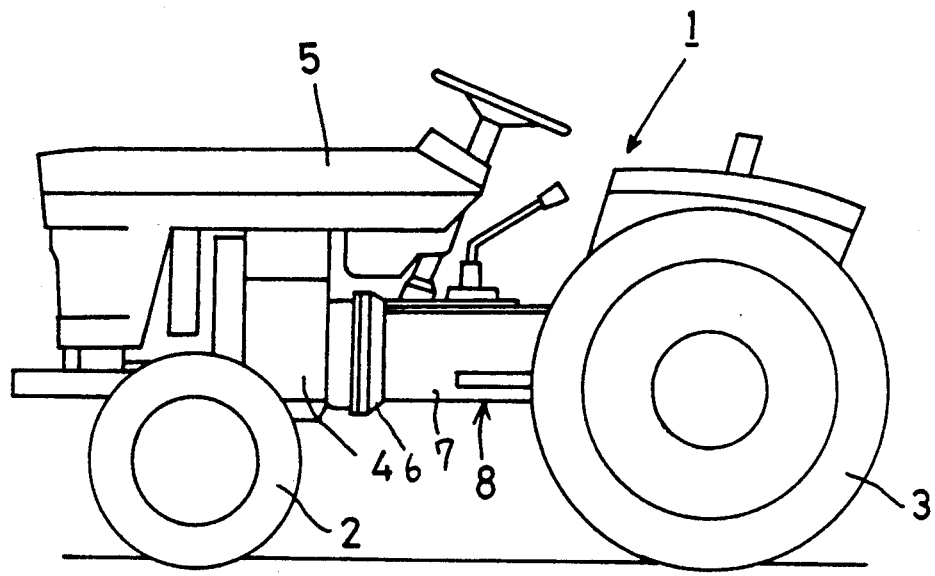
FIG. 1 is a side elevation of a tractor.

FIG. 1 shows a tractor 1 embodying the present invention. This tractor 1 is a two-axle, four-wheel type tractor comprising front wheels 2 and rear wheels 3. The tractor 1 further comprises an engine 4 covered by a hood 5, and a flywheel housing 6 and a clutch housing 7 rigidly interconnected to form a tractor frame 8 rearwardly of the engine 4.

Figure 2:
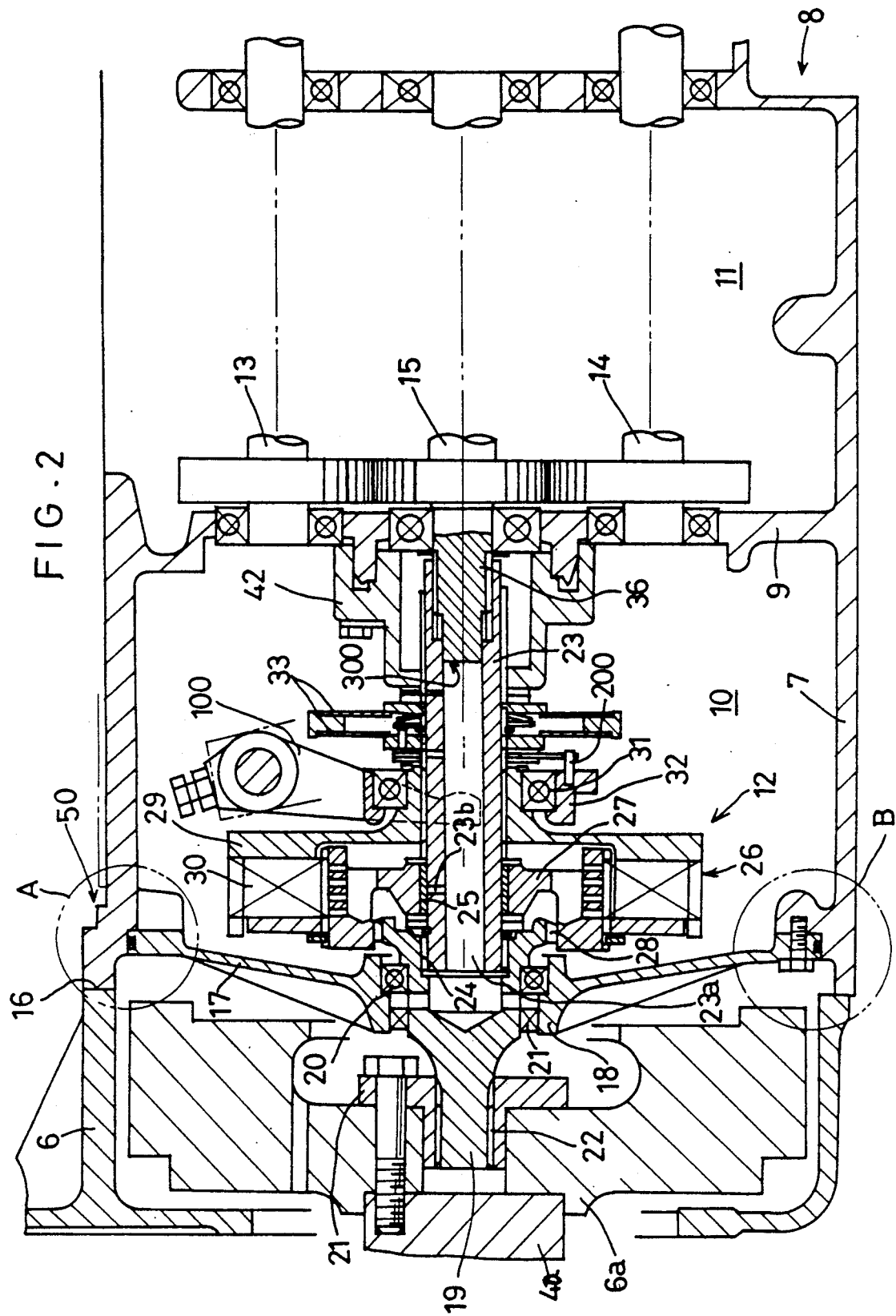
FIG. 2 is a sectional side view of a main clutch and adjacent components.

Referring to FIG. 2, the clutch housing 7 is divided by a partition wall 9 into a forward, clutch compartment 10 and a rear, change speed compartment 11. The clutch compartment 10 contains a main clutch 12 is an oil bath. The change speed compartment 11 contains a propelling speed changer 13 and a PTO speed changer 14 vertically arranged with a main change speed shaft 15 in between.

The flywheel housing 6 is fixed to a rear face of the engine 4, and surrounds a flywheel 6a connected to an engine output shaft 14. The flywheel housing 6 has an open rear end forwardly detachably connected as at 16 to a forward end of the clutch housing 7 by means of bolts or the like not shown.

At the forward end of the clutch housing 7 is a partition wall 17 provided for stopping oil flow therefrom to the flywheel housing 6. The partition wall 17 is bolted at peripheral positions to a connecting portion 50 of the clutch housing 7. This connecting structure will be described in detail later.

The partition wall 17 includes a tubular boss 18 in a central position thereof extending in the fore and aft direction. A clutch input shaft 19 extends through and is supported by the tubular boss 18 through a bearing 20. An oil seal 21 is provided adjacent the bearing 20 for stopping oil flow.

A female spline shaft 22 is attached to a rear end of the flywheel 6a to be coaxial with the engine output shaft 14. The clutch input shaft 19 is in spline engagement with the female spline shaft 22.

The main clutch 12 comprises a clutch pack 26 for connecting the clutch input shaft 19 to a clutch output shaft 23 for relative rotation through a needle bearing 24 and a bush 25.

The clutch pack 26 is supported by the clutch output shaft 23 through the bush 25, and a drive disk 27 having clutch plates is connected to the clutch input shaft 19 through a meshing portion 28. A driven disk 29 is splined to the clutch output shaft 23 to be axially slidable thereon. The drive disk 27 and driven disk 29 are engageable and disengageable through clutch plates 30.

Instead of the clutch input shaft 19 and drive disk 27 being interconnected through the meshing portion 28, the clutch input shaft 19 and drive disk 27 may be formed integral with each other, with the meshing portion 28 omitted. Such a construction has the advantage of low manufacturing cost.

Figure 3:
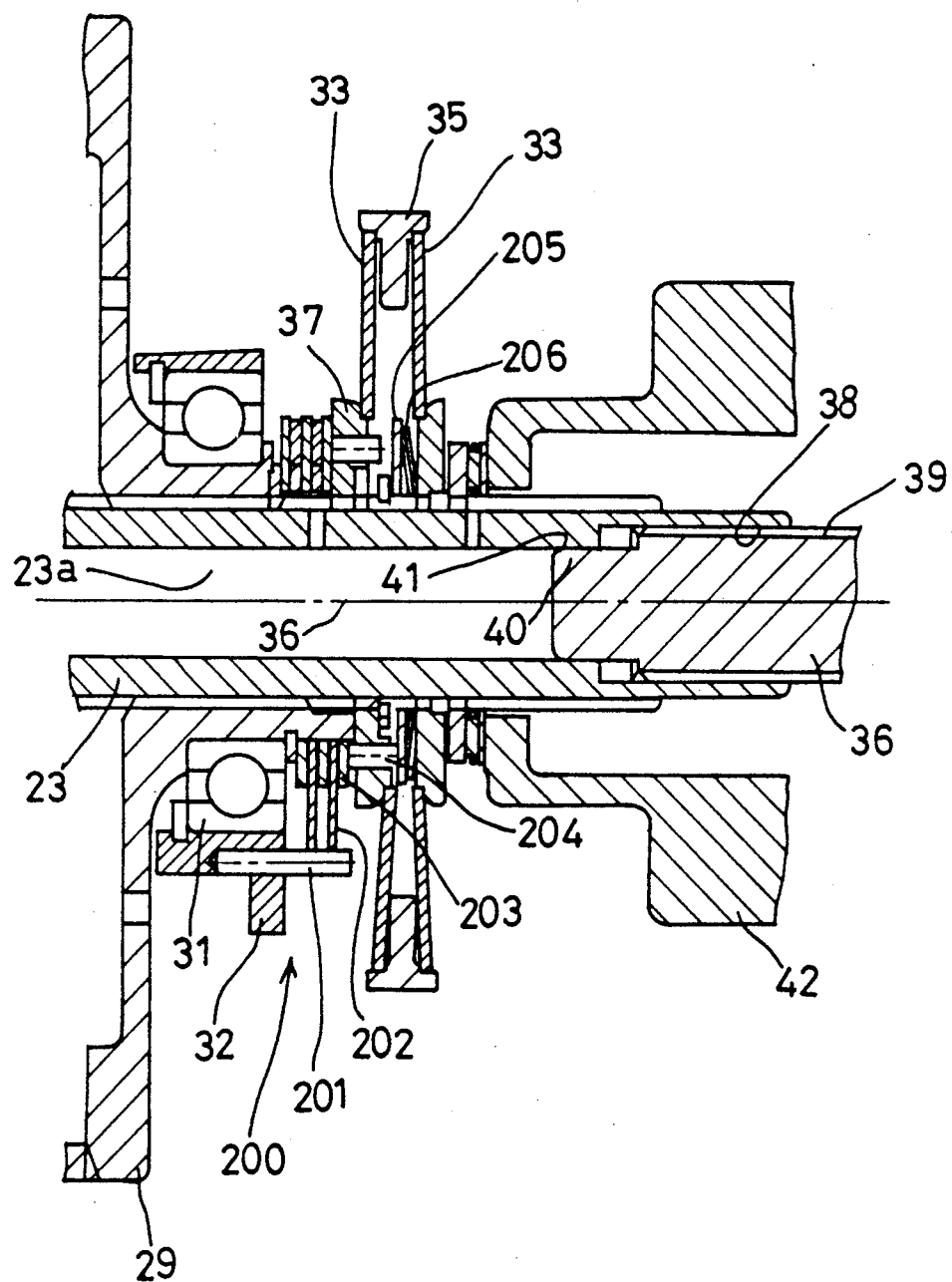
FIG. 3 is an enlarged sectional view of a connection between a clutch output shaft and a main change speed shaft.

As shown in FIG. 3, the clutch plates 30 are releasable by operating a shift fork 100 (FIG. 6) to move a sleeve 32 of a release bearing 31, i.e. the driven disk 29, rightward on the clutch output shaft 23 against a disk spring 33 through a spring guide 37 engaging the clutch output shaft 23.

Conversely, the clutch plates 30 are engageable by operating the shift fork 100 to move the sleeve 32 or driven disk 29 leftward. The disk spring 33 provides a clutching force.

The disk spring 33 includes two disks with a spring support 35.

In FIG. 3, the upper half above an longitudinal axis 36 shows a clutch engaging state, while the lower half shows a clutch releasing state.

Number 200 indicates a device for stopping inertial rotation, and more particularly for reliably braking a drag torque to prevent the drag torque from being transmitted to the clutch output shaft 23, when the clutch is disengaged.

This rotation stopping device 200 is required particularly where a wet clutch is employed. That is, when the clutch is disengaged, cohesion between a friction member and an opposed plate or the presence of oil between the friction member and opposed plate often produces a drag torque or a force for rotating the output side of the clutch.

the rotation stopping device 200 comprises a first pin 201 fixed to the sleeve 32, two disks 202 attached to the first pin 201, plates 203 arranged between and at opposite sides of the disks 202, a second pin 204 fixed to one of the plates 203 for extending through the spring guide 37, a spring presser plate 205 for contacting an end face of the second pin 204 when the latter moves rightward, and a small disk spring 206.

When the clutch is disengaged, that is when the sleeve 32 is moved rightward, the first pin 201 and thus the disks 202 move rightward into tight contact with the plates 203. Since the second pin 204 is operatively connected to the clutch output shaft 23 through the spring guide 37, the clutch output shaft 23 is braked by the frictional force applied by the disks 202 and plates 203. The small disk spring 206 applies a resilient force to the plates 203 through the spring presser plate 205 and the second pin 204.

How the main change speed shaft 15 is connected to the clutch output shaft 23 will be described next.

The main change speed shaft 15 includes a portion 36 projecting forward from the partition wall 9. This projecting portion 36 has a stepped construction defining a large-diameter outer spline portion 39 and a small-diameter cylindrical plugging end portion 40. The end portion 40 is inserted into a bore 41 at the rear end of the clutch output shaft 23. That is, the end portion 40 and bore 41 constitute a geometric engaging device 300. The rear end of the clutch output shaft 23 defines an inner spline portion 38 which, in combination with the outer spline portion 39, provides a spline connection. The bore 41 communicates with an axial bore 23a for receiving lubricating oil, which in turn communicates with radial bores 23b. Further, a propeller shaft case 42 is secured to the partition wall 9.

Figure 4:
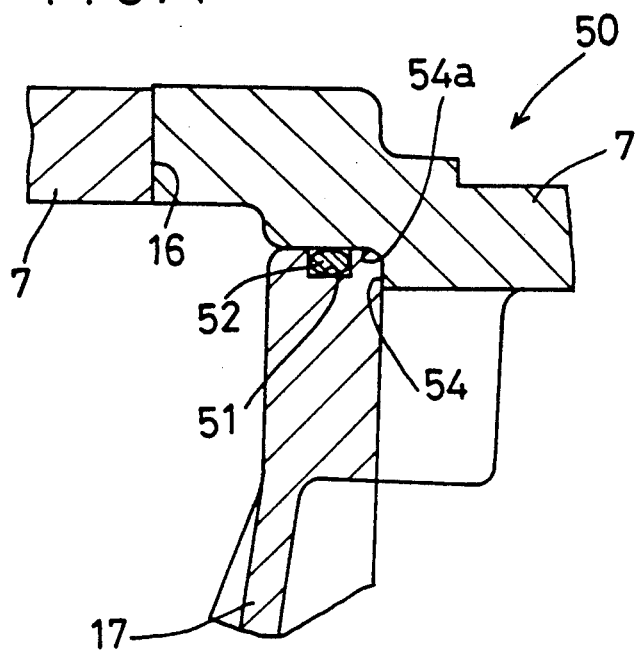
FIG. 4 is an enlarged sectional view of a region marked A of FIG. 2.
Figure 5:
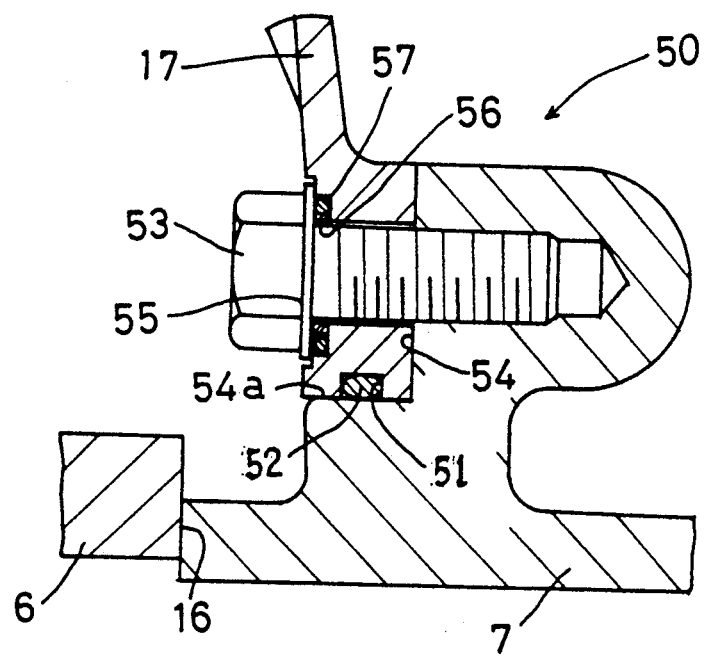
FIG. 5 is an enlarged sectional view of a region marked B of FIG. 2.

How the partition wall 17 is connected to the clutch housing 7 will be described next with reference to FIGS. 2, 4 and 5. FIG. 4 is an enlarged view of the region marked A in FIG. 2, and FIG. 5 an enlarged view of the region marked B.

The partition wall 17 defines a groove 51 around an outer periphery thereof, and an O-ring 52 is fitted in the froove 51. The partition wall 17 is fitted in the fore and aft direction in the open forward region of the clutch housing 7, and fixed to the clutch housing 7 by bolts 53.

The clutch housing 7 defines a geometric engaging portion, or a stepped portion 54 in this example, for receiving and limiting the outer periphery of the partition wall 17 in the fore and aft direction. The partition wall 17 is fitted in the geometric engaging portion 54 and fixed thereto by the bolts 53, with the O-ring 52 sealing an inner peripheral surface 54a of the geometric engaging portion 54.

Each bolt 53 has a seat 55 for pressing an O-ring 57 provided peripherally of a sealing ring 56, to prevent the oil from leaking through a threaded portion of the bolt 53.

The inner peripheral surface 54a of the geometric engaging portion 54 is disposed coaxially with the bearing 18 of the partition wall 17 with high precision. the cantering of the inner peripheral surface 54a is achieved only by securing it in position by the bolts 53 without using a knock pin. Besides, support provided by the entire peripheral surface assures mounting strength.

Figure 6:
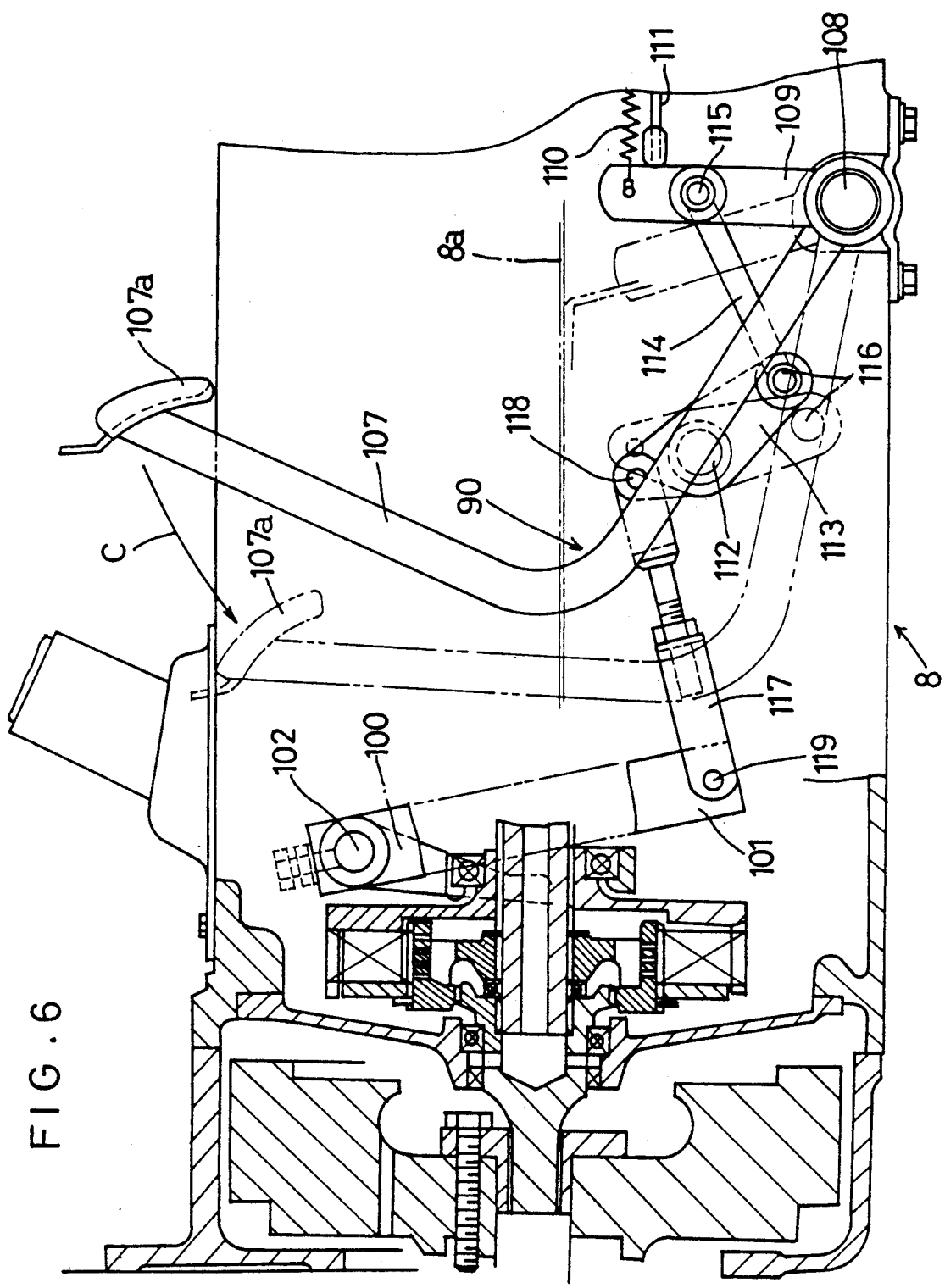
FIG. 6 is a side view of a mechanism for operating the main clutch.

A control mechanism for operating the main clutch 12 will be described with reference to FIGS. 6 through 9. FIG. 6 corresponds to FIG. 2, with the control mechanism additionally illustrated.

As shown, a clutch lever 101 is attached to a shaft 102 extending transversely of and supported by the tractor frame 8. The shift fork 100 mentioned hereinbefore includes a boss 103 mounted on the shaft 102, and a forked portion 104 engaging projecting portion 32a of the sleeve 32 of bearing 31 from a rear end thereof.

The boss 103 is fixed to the shaft 102 by tapered bolts 105 having lock nuts and inserted into upper openings of the boss 103. The bolts 105 are inserted from an obliquely forward direction, thereby avoiding the wet type main clutch 12 becoming axially extensive to be difficult to mount in position with regard to space.

The clutch lever 106 is operative connected to a clutch pedal 107 through a link mechanism 90. The main clutch 12 is disengaged with depression of pedal 107 in the direction of arrow C.

The clutch pedal 107 is supported at a lower position thereof on a pedal shaft 108, and is depressably disposed laterally of the tractor frame 8. The clutch pedal 107 is approximately L-shaped in side view, including a tread 107a at an upper end and an arm 109 at a lower end. An end of a return spring 110 is connected to the arm 109 to urge the arm 109 against a stopper 111.

A relaying clutch link supporting point 112 is disposed laterally of the tractor frame 8 between the clutch lever 101 and pedal 107. This supporting point 112 is provided by a shaft projecting laterally, on which a clutch link 113 is pivotably supported. The clutch link 113 is disposed below a foot rest 8a.

The clutch link 113 and arm 109 are pivotally connected to each other through a rear clutch rod 114 and pins 115 and 116. This rod 114 is connected to a lower end of the clutch link 113.

The clutch link 113 and clutch lever 101 are pivotally connected to each other through a forward clutch rod 117 and pins 118 and 119. These components constitute the link mechanism 90. The pin 116 is located farther from the link supportin point 112 than the pin 118, thereby allowing the clutch pedal 107 to be depressed with a small force.

Figure 7:
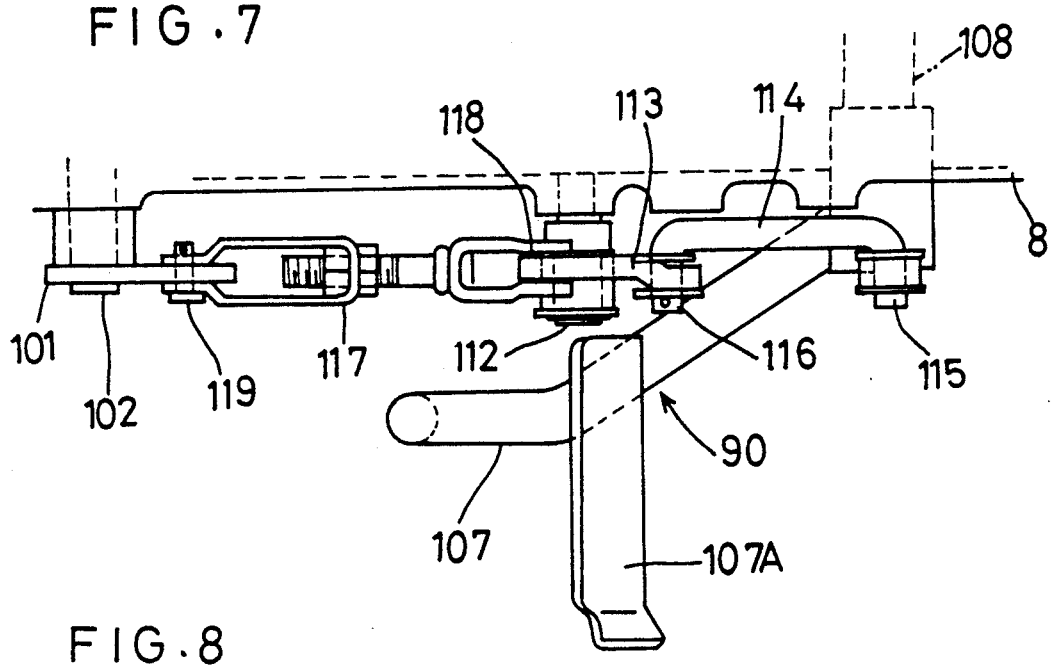
FIG. 7 is a plan view of a principal portion of FIG. 6.
Figure 8:
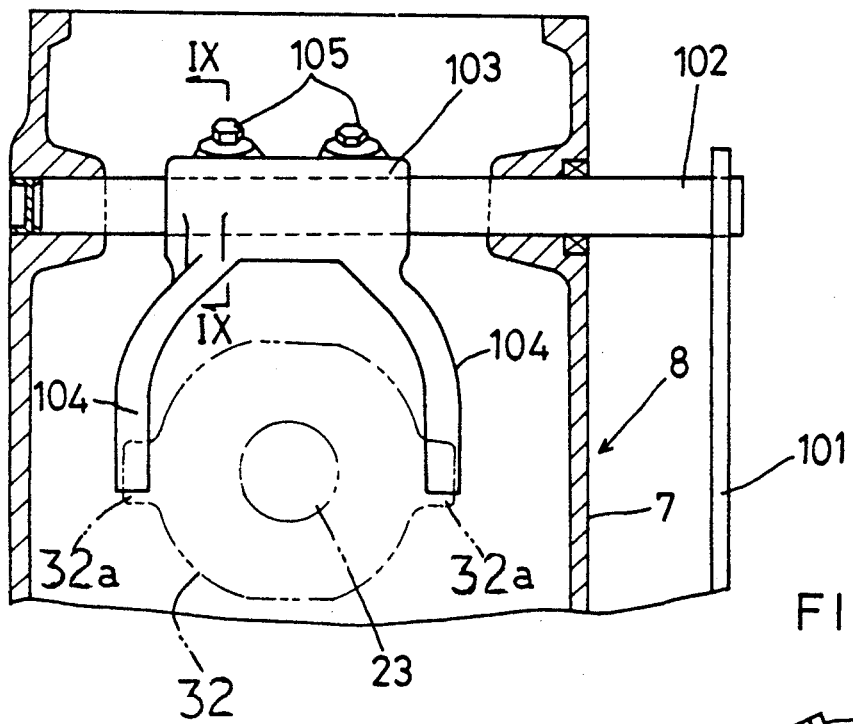
FIG. 8 is a sectional view of a clutch release fork.
Figure 9:
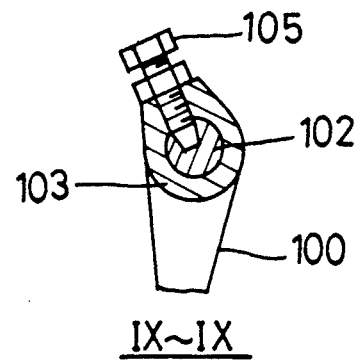
FIG. 9 is a section taken on line IX—IX of FIG. 8.

The forward clutch rod 117 comprises a screw shaft to be extendible and contractible. As shown in FIG. 7, the link mechanism 90 extends in the fore and aft direction along a lateral face of the tractor frame 8a below the foot rest 8a.

As described above, the clutch control mechanism 90 includes the relaying clutch link supporting point 112 disposed between the clutch lever 101 and pedal 107. The relaying clutch link 113 pivotably supported on the supporting point 112 is operatively connected to the pedal 107 through the rear clutch rod 114, and to the clutch lever 101 through the forward clutch rod 117. The forward clutch rod 117 is connected to a position of the clutch link 113 located closer the link supporting point 112 than the position of the clutch link 113 to which the rear clutch rod 114 is connected. therefore, even if the releasing load for operating the wet type main clutch is increased, the pedal depressing force may be lessened by providing the interlocking structure including the relaying link 113 and the forward and rearward clutch rods 117 and 114.

Figure 10:
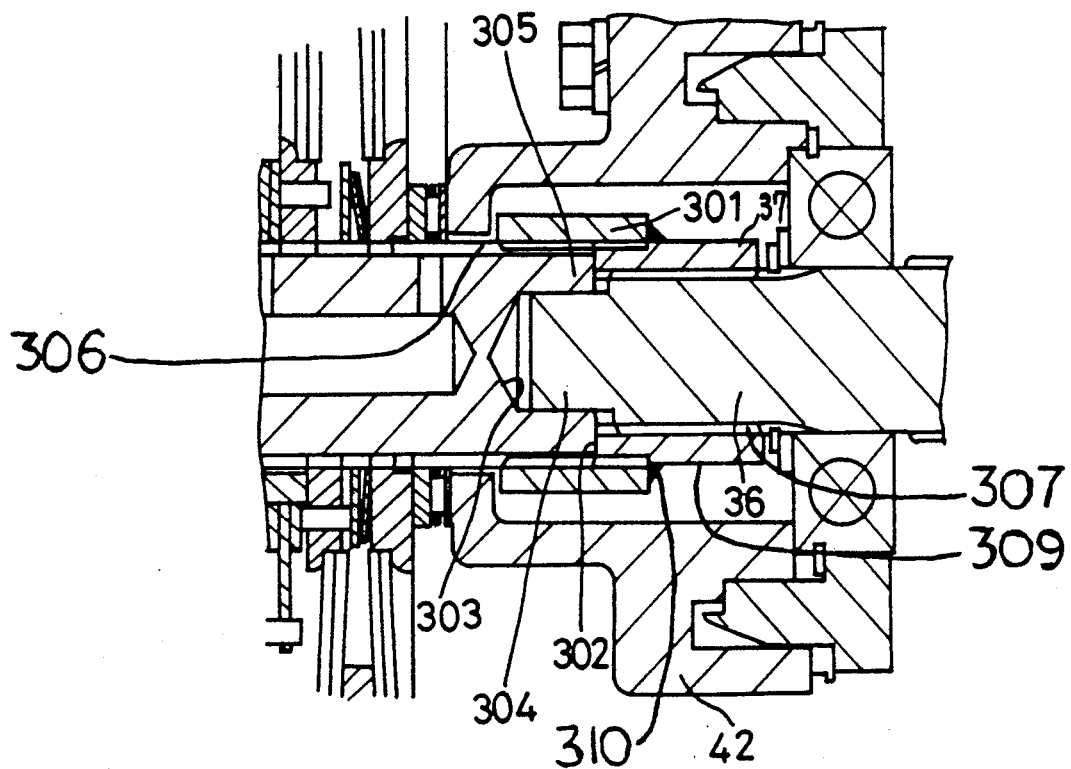
FIG. 10 is an enlarged sectional view of a modified connection between the clutch output shaft and main change speed shaft.

A modified spline connection will be described next with reference to FIG. 10.

the main change speed shaft 15 includes the portion 36 projecting forwardly from the partition wall 9. As shown in FIG. 10, the projecting portion 36 includes a spline portion 307 with which a two-pieced spline sleeve 37 is meshed. Sleeve 37 includes pieces 301 and 309 attached to each other at a connection point 310. the clutch output shaft 23 includes a spline portion 306 removable inserted in spline engagement with the spline sleeve 37. The spline sleeve 37 includes an inner stepped portion 302 at a longitudinally intermediate position thereof for limiting the insertion of the clutch output shaft 23. The clutch output shaft 23 defines a recess 303 in the rear end surface thereof. The projecting portion 36 defines a projecting end 304 forming a geometric connection with the recess 303. This connection acts as a device having an aligning function.

The spline sleeve 37 is surrounded by the propeller case 42 bolted to the partition wall 9. The propeller case 42 has a rear end which itself acts as a bearing retainer.

What is claimed is:

1. A transmission for transmitting an engine drive from an engine to wheels, comprising:
   a clutch housing (7);
   a flywheel housing removably attached to a forward end of said clutch housing adjacent to the engine;
   a partition wall (17) sealably removably connected at the forward end of said clutch housing;
   a rear wall disposed at a rear end of the clutch housing (7) for defining an oil bath in the clutch housing together with the clutch housing and the partition wall;
   a flywheel connected to an engine output shaft and housed in the flywheel housing;
   a clutch input shaft (19) supported by said partition wall (17) through a bearing (20) and including a forward end splined to the flywheel and a rearward end projecting into the oil bath;
   a clutch output shaft having a forward end freely rotatably supported by the rearward end of the clutch input shaft at a front end thereof, said clutch output shaft being disposed in the oil bath;
   a wet type clutch disposed in the oil bath and including an input portion connected to the clutch input shaft and an output portion connected to the clutch output shaft;
   a main change speed shaft supported by the rear wall of the clutch housing through a bearing and having a projecting portion projecting into the oil bath, said main shange speed shaft being coaxial along a longitudinal axis with the clutch output shaft, said projecting portion being connected to a rear end of the clutch output shaft by spline connection means;
   wherein the rear end of the clutch output shaft receives the projecting portion of the main change speed shaft and aligns longitudinal axes of the clutch output shaft and the main change speed shaft, and allows the rear end of the clutch output shaft to be supported by the partition wall through the projecting portion of the main change speed shaft.

2. A transmission as claimed in claim 1, wherein said spline connection means includes an inner spline portion defined in an inside wall of said clutch output shaft which is formed as a tubular shaft, and an outer spline portion defined on an outer wall of said projecting portion of said main change speed shaft.

3. A transmission as claimed in claim 1 wherein said spline connection means includes a spline sleeve mounted on the projecting portion of the main change speed shaft and having a forward larger inner spline portion and a rearward smaller inner spline portion, a spline portion defined on the rear end of the clutch output shaft inserted into the forward larger inner spline portion of the spline sleeve, and a spline portion defined on the projecting portion of the main change speed shaft inserted into the rearward smaller spline portion of the spline portion sleeve, said spline sleeve defining a stepped portion for limiting insertion of the clutch output shaft.

4. A transmission as claimed in claim 1 wherein said partition wall defines a peripheral groove around an outer periphery thereof for receiving an O-ring, and said clutch housing defines an engaging device engageable with the outer perpiphery of the partition wall in the longitudinal axis direction and sealed by the O-ring, said clutch housing and the partition wall being fixedly interconnected through bolts.

* * * * *

UNITED STATES PATENT AND TRADEMARK OFFICE
CERTIFICATE OF CORRECTION

PATENT NO. : 5,016,743

DATED : May 21, 1991

INVENTOR(S) : Masayori Kajino

It is certified that error appears in the above-identified patent and that said Letters Patent is hereby corrected as shown below:

Title page, after Inventor:, "Masayor Kajino" should read --Masayori Kajino--.

Column 1 Line 48 "the the" should read --of the--.

Column 2 Line 10 "flows" should read --flow--.

Column 3 Line 1 "is" should read --in--.

Column 3 Line 57 "an" should read --a--.

Column 4 Line 4 "the" should read --The--.

Column 4 Line 47 "froove" should read --groove--.

Column 4 Lines 64-65 "the cantering" should read --The centering--.

Column 5 Line 9 after "engaging" insert --a--.

UNITED STATES PATENT AND TRADEMARK OFFICE
CERTIFICATE OF CORRECTION

PATENT NO. : 5,016,743

DATED : May 21, 1991

INVENTOR(S) : Masayori Kajino

It is certified that error appears in the above-identified patent and that said Letters Patent is hereby corrected as shown below:

Column 5 Line 43 "supportin" should read --supporting--.

Column 5 Line 49 "frame 8a" should read --frame 8--.

Column 5 Line 61 "therefore" should read --Therefore--.

Column 6 Line 1 "the" (first occurrence) should read --The--.

Column 6 Line 6 "the" should read --The--.

Column 6 Line 8 "removable" should read --removably--.

Claim 1 Line 40 Column 6 after "shaft" delete --at a front end thereof--.

Claim 1 Line 49 Column 6 "shange" should read --change--.

Signed and Sealed this

Eighth Day of December, 1992

*Attest:*

DOUGLAS B. COMER

*Attesting Officer*     *Acting Commissioner of Patents and Trademarks*